US012072739B2

(12) United States Patent
Han et al.

(10) Patent No.: US 12,072,739 B2
(45) Date of Patent: Aug. 27, 2024

(54) ELECTRONIC APPARATUS WITH SLIDABLE FLEXIBLE SCREEN

(71) Applicant: Lenovo (Beijing) Limited, Beijing (CN)

(72) Inventors: Liang Han, Beijing (CN); Ran Zhang, Beijing (CN); Tianshui Tan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/161,089

(22) Filed: Jan. 30, 2023

(65) Prior Publication Data

US 2023/0244273 A1 Aug. 3, 2023

(30) Foreign Application Priority Data

Jan. 29, 2022 (CN) .......................... 202210111352.9

(51) Int. Cl.
*G06F 1/16* (2006.01)
(52) U.S. Cl.
CPC .......... *G06F 1/1652* (2013.01); *G06F 1/1624* (2013.01); *G06F 1/1637* (2013.01)
(58) Field of Classification Search
CPC .............. B41K 1/02; B41K 1/04; B41K 1/22; B41K 1/40; B41K 3/56; B41K 1/36; B41K 1/38; B41K 1/58; G06F 1/1616; G06F 1/1624; G06F 1/1637; G06F 1/1652; G06F 1/1681
See application file for complete search history.

(56) References Cited

U.S. PATENT DOCUMENTS 11,526,198 B1\* 12/2022 Kanas .................... G06F 1/1624
2022/0124923 A1\* 4/2022 Zhang .................. H05K 5/0217
2023/0013135 A1\* 1/2023 Chen ..................... H01Q 1/2291

\* cited by examiner

*Primary Examiner* — Chun-Nan Lin
(74) *Attorney, Agent, or Firm* — ANOVA LAW GROUP, PLLC (57) ABSTRACT

An electronic apparatus includes a first body, a second body, and a flexible screen. The second body is rotatably connected to the first body through a rotation shaft device to cause an opening and closing angle of the first body relative to the second body to be adjustable. The flexible screen is configured to display images. An end of the flexible screen is slidably arranged at the first body along a connection line direction of the first body and the second body. A second end is slidably arranged at the second body along the line connection direction. The first end and the second end are two ends of the flexible screen in the connection line direction. The first end and the second end of the flexible screen synchronously slide along the connection line direction to adjust a size of a part of the flexible screen located at the first body.

10 Claims, 8 Drawing Sheets

ELECTRONIC APPARATUS WITH SLIDABLE FLEXIBLE SCREEN

CROSS-REFERENCE TO RELATED APPLICATION

This application claims priority to Chinese Patent Application No. 202210111352.9, filed on Jan. 29, 2022, the entire content of which is incorporated herein by reference.

TECHNICAL FIELD

The present disclosure relates to the electronic apparatus technology field and, more particularly, to an electronic apparatus.

BACKGROUND

A screen size of an existing electronic apparatus such as a laptop computer or a mobile phone is fixed, which cannot meet diverse needs for different screen sizes.

SUMMARY

Embodiments of the present disclosure provide an electronic apparatus including a first body, a second body, and a flexible screen. The second body is rotatably connected to the first body through a rotation shaft device to cause an opening and closing angle of the first body relative to the second body to be adjustable. The flexible screen is configured to display images. An end of the flexible screen is slidably arranged at the first body along a connection line direction of the first body and the second body. A second end is slidably arranged at the second body along the line connection direction. The first end and the second end are two ends of the flexible screen in the connection line direction. The first end and the second end of the flexible screen synchronously slide along the connection line direction to adjust a size of a part of the flexible screen located at the first body.

DETAILED DESCRIPTION OF THE EMBODIMENTS

Embodiments of the present disclosure provide an electronic device to meet the diversified requirements of screen size.

To make the purposes, technical solutions, and advantages of embodiments of the present disclosure clearer, the technical solutions of embodiments of the present disclosure are described below in detail in connection with the accompanying drawings of embodiments of the present disclosure. The described embodiments are a part of embodiments of the present disclosure, not all embodiments. Based on embodiments of the present disclosure, all other embodiments obtained by those of ordinary skill in the art without creative efforts are within the scope of the present disclosure.

With reference to FIGS. 1 to 10, an electronic apparatus of embodiments of the present disclosure includes a first body, a second body, and a flexible screen 1. The second body is rotatably connected to the first body through a rotation shaft device 2 to realize an adjustable opening and closing angle of the first body relative to the second body. The flexible screen 1 is configured to display images. A first end of the flexible screen 1 can be slidably arranged at the first body along a connection line direction of the first body and the second body. A second end of the flexible screen 1 can be slidably arranged at the second body along the connection line direction. The first end and the second end are two ends of the flexible screen 1 in the connection line direction. By synchronously sliding the first end and the second end of the flexible screen 1 along the connection line direction, a size of the flexible screen 1 located at the first body can be adjusted.

The flexible screen 1 can have a bendable feature. Thus, the flexible screen can deform by adapting to a sliding position while usability of the flexible screen 1 is ensured.

The electronic apparatus of the present disclosure can be configured to display images through a part of the flexible screen 1 located at the first body. The opening and closing angle of the first body relative to the second body can be changed through rotations of the first body and the second body around the rotation shaft device 2 to adjust a display angle of the flexible screen 1.

By synchronously sliding the first end of the flexible screen 1 relative to the first body and the second end of the flexible screen 1 relative to the second body along the connection line direction of the first body and the second body, a size of the part of the flexible screen 1 located at the first body can be adjustable to meet the diverse needs of the screen size.

Moreover, in embodiments of the present disclosure, by adjusting the size of the part of the flexible screen 1 located at the first body, a position of the first end of the flexible screen 1 can be changed to cause a position of user eyesight to be adjustable. Thus, the flexible screen 1 can adapt to different user habits to improve user experience.

To facilitate adjusting the size of the part of the flexible screen 1 at the first body, the electronic apparatus can further include a drive structure. The drive structure can be configured to drive the first end and the second end of the flexible screen 1 to slide synchronously along the connection line direction. In the present disclosure, the drive structure can be configured to drive the first end of the flexible screen 1 relative to the first body and the second end of the flexible screen 1 relative to the second body to slide synchronously along the connection line direction between the first body and the second body. Thus, the size of the part of the flexible screen 1 located at the first body can be automatically adjusted, which simplifies an operation and saves labor. In the present disclosure, the size of the part of the flexible screen 1 located at the first body can be adjusted by pushing and pulling manually.

Figure 1:
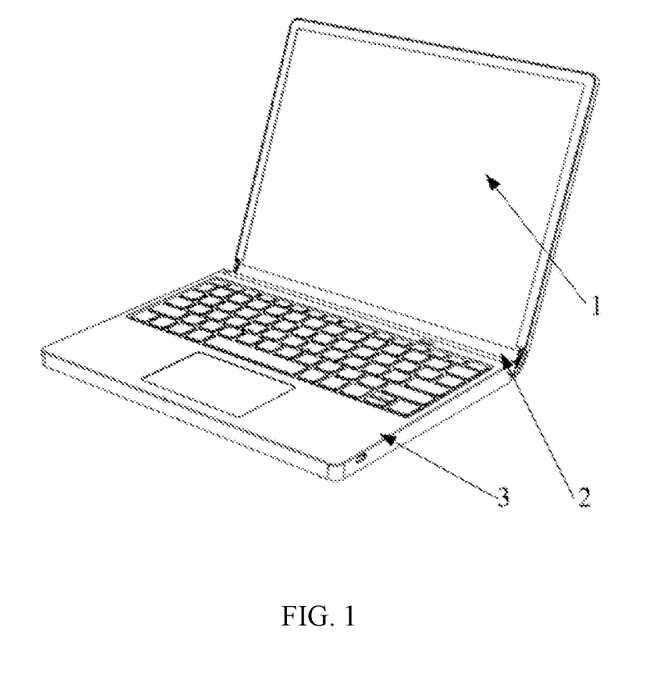
FIG. 1 illustrates a schematic structural diagram of an electronic apparatus according to embodiments of the present disclosure.
Figure 2:
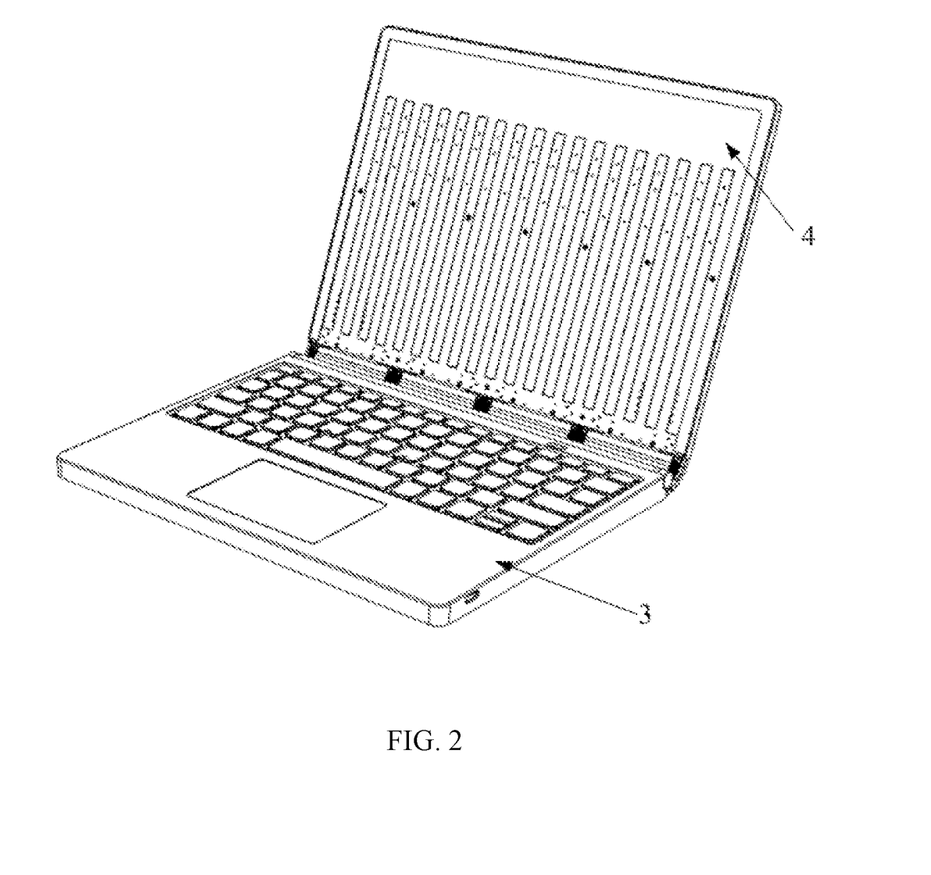
FIG. 2 illustrates a schematic structural diagram showing removal of a flexible screen when the flexible screen slides into a second body of an electronic apparatus according to embodiments of the present disclosure.
Figure 3:
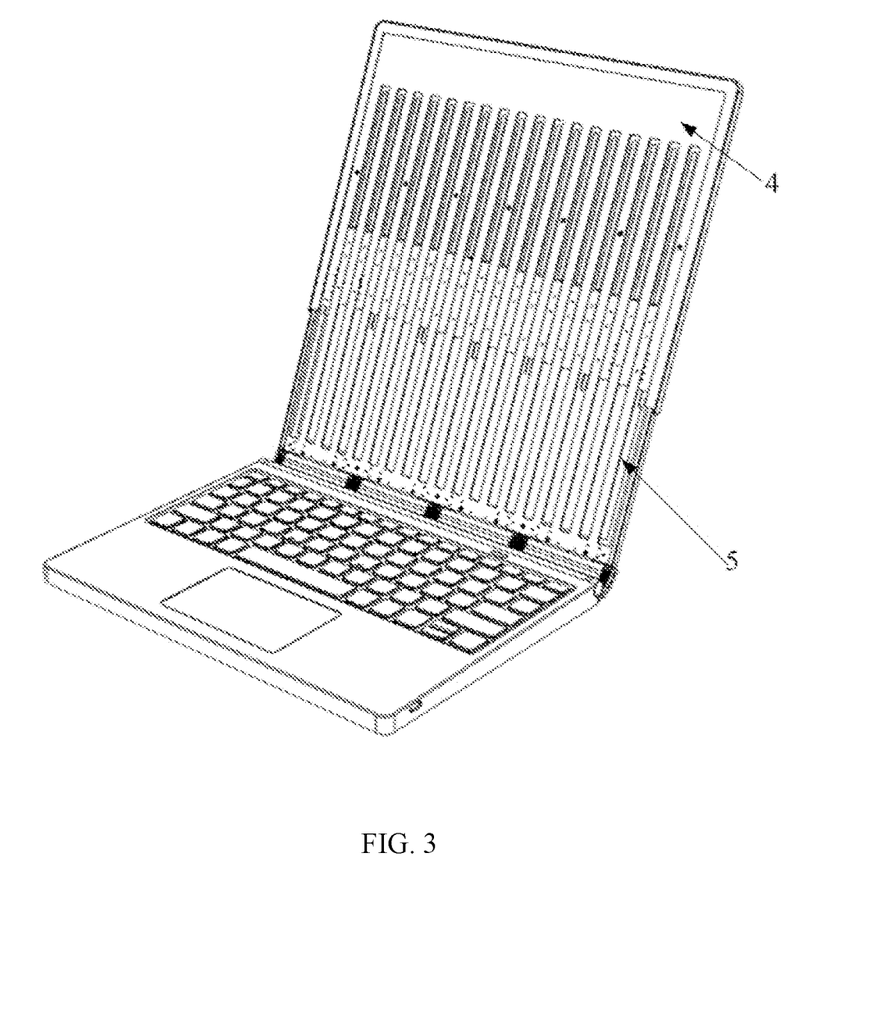
FIG. 3 illustrates a schematic structural diagram removal of a flexible screen when the flexible screen slides out of a second body of an electronic apparatus according to embodiments of the present disclosure.
Figure 4:
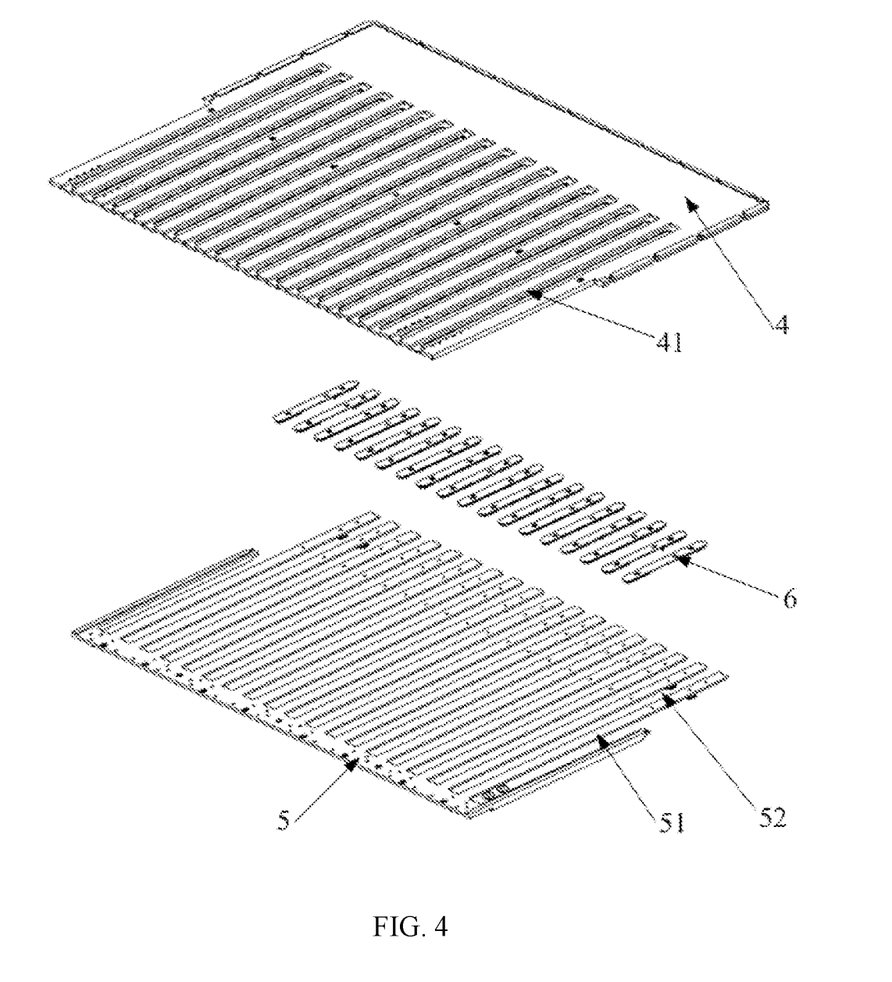
FIG. 4 illustrates a schematic exploded structural diagram showing a first sliding holder and a fixed holder according to embodiments of the present disclosure.

As shown in FIGS. 2 to 4, in some embodiments, the first body includes a fixed holder connected to the rotation shaft device 2 and a first sliding holder 4. The fixed holder is provided with a guide structure. The first sliding holder 4 is provided with a sliding structure slidably cooperated with the guide structure along the connection line direction. The first end can be fixed at the first sliding holder 4. The second body includes a base 3 connected to the rotation shaft device 2 and a second sliding holder 10 slidably arranged at the base 3 along the connection line direction. The base 3 is provided with an accommodation groove configured for the second end to be inserted into. The second sliding holder 10 is arranged at a bottom of the accommodation groove. The second end is arranged at the second sliding holder 10.

In some embodiments, the fixed holder can be connected to the base 3 through the rotation shaft device 2. The opening and closing angle of the fixed holder relative to the base 3 can be changed through the rotation of the fixed holder relative to the base 3 around the rotation shaft device 2.

By driving the first end of the flexible screen 1 relative to the fixed holder through the first sliding holder 4 and the second end of the flexible screen 1 relative to the base 3 through the second sliding holder 10 to synchronously slide along the connection line direction of the first body and the second body, the size of the part of the flexible screen 1 located at the first body can be adjustable.

During the sliding process, the sliding structure of the first sliding holder 4 can slide along the guide structure of the fixed holder, and the second sliding holder 10 can slide out of or slide into the accommodation groove of the base 3 synchronously. Thus, the part of the flexible screen 1 located at the second body can be hidden in the second body to prevent the part of the flexible screen 1 that is not used from exposing to the outside to affect the application of the second body. Meanwhile, the cleanliness of the appearance can also be improved.

In the present disclosure, the above accommodation groove may not be provided. The second sliding holder 10 can be arranged on an outer surface of the base, and the part of the flexible screen 1 located at the second body can be exposed to the outside to assist input or another function.

As shown in FIG. 4, to facilitate processing, the fixed holder includes a fixed support plate 5 and a guide rod 6 arranged at the fixed support plate 5. The guide rod 6 can extend along the connection line direction. The guide structure includes guide grooves arranged on two sides of the guide rod 6.

The first sliding holder 4 can be a first sliding support plate that is stacked on the fixed support plate 5. A chute 41 can be arranged at the first sliding support plate. The sliding structure can be a sliding protrusion arranged on two sidewalls of the chute 41. The sliding protrusion can correspond to the guide groove one by one. The second sliding holder 10 can be a second sliding support plate.

In the present disclosure, the first end of the flexible screen 1 can be driven to slide by the first sliding support plate. The fixed support plate 5 can be configured to provide support for the sliding of the first sliding support plate. The guide grooves on the two sides of the guide rod 6 can slidably cooperate with the sliding protrusions on the two sidewalls of the chute 41 of the first sliding support plate to guide the sliding of the first sliding support plate. Thus, the position of the first end of the flexible screen 1 can be adjusted. The sliding guidance can be better, which ensures the reliability of the sliding of the first end of the flexible screen 1.

Moreover, in the present disclosure, a guide structure can be formed through the guide groove at the guide rod 6. The guide groove can be separately formed at the guide rod 6. Then, the guide rod 6 can be mounted at the fixed support plate 5 to facilitate assembly. Meanwhile, the first end of the flexible screen 1 can be supported and fixed by the first sliding support plate. The second end of the flexible screen 1 can be supported and fixed by the second sliding support plate. As such, the flexible screen 1 can be supported with a good support strength to improve the sliding reliability of the flexible screen 1.

In the present disclosure, the guide structure can also have another form, such as a guide protrusion formed directly on the fixed support plate 5. Through the guide protrusion, the sliding cooperation can be formed directly with the chute 41 of the first sliding support plate. Thus, the same technical effect of guiding the sliding direction of the first sliding support plate can be realized.

The above support plates can also have other structures, such as a support frame formed by fixing support rods together, which is not limited to the present disclosure.

To further ensure the smooth sliding of the first sliding support plate, a surface friction coefficient of the guide rod 6 can be smaller than a surface friction coefficient of the fixed support plate 5. Thus, the surface of the guide rod 6 can be relatively smooth and have a self-lubricating feature, which can make the first sliding support plate move steadily and smoothly.

In some embodiments, the guide rod 6 can be made of polyformaldehyde (POM). The guide groove can be formed by two guide pieces stacked in the middle with gaps on two sides. The two guide pieces can be fixed at the fixed support plate 5 by screws.

In some embodiments, a plurality of guide rods 6 can be provided and can be uniformly distributed along the direction of the rotation axis of the rotation shaft device 2. A plurality of chutes 41 can be provided and correspond to the guide rods 6 one by one. Position-limiting surfaces can be arranged at two ends of the chute 41 along the connection line direction. The position-limiting surfaces can limit the guide rod from departing from the chute 41. In the present disclosure, the guide grooves of the plurality of guide rods 6 can be configured to slidably cooperate with the sliding protrusions of the plurality of chutes 41 one by one, which ensures the first sliding support plate to slide stably and smoothly relative to the fixed support plate 5. In some other embodiments, another number of the guide rods 6 can be provided, such as two, which can be arranged at two sides of the fixed support plate 5, respectively, to realize double track sliding.

In some embodiments, the fixed support plate 5 can include a plurality of avoidance grooves 52 evenly distributed along the direction of the rotation axis. The avoidance grooves 52 can divide the side of the fixed support plate 5 away from the rotation axis device 2 into a plurality of support stripes 51. The guide rods 6 can be arranged at the support stripes 51 in a one-to-one correspondence. The first sliding support plate can have the plurality of sliding support stripes 51 that are in the avoidance grooves 52 in a one-to-one correspondence. A surface of the sliding support stripes 51 away from the flexible screen 1 and a surface of the fixed support plate 5 away from the flexible screen 1 can satisfy a coplanar condition. Satisfying the coplanar condition can refer to being coplanar or substantially coplanar. The sliding support stripes 51 can cooperate with the avoidance grooves 52 with clearances to avoid friction resistance between the sliding support stripes 51 and the avoidance grooves 52 during sliding.

In embodiments of the present disclosure, the surfaces of the first sliding support plate and the fixed support plate 5 away from the flexible screen 1 can be located in a same plane. Thus, the first sliding support plate and the fixed support plate 5 can have an overlapping thickness, which reduces the overall thickness of the first body. In the present disclosure, the avoidance grooves 52 may not be provided, and the first sliding support plate and the fixed support plate 5 can be stacked together with a gap.

Figure 6:
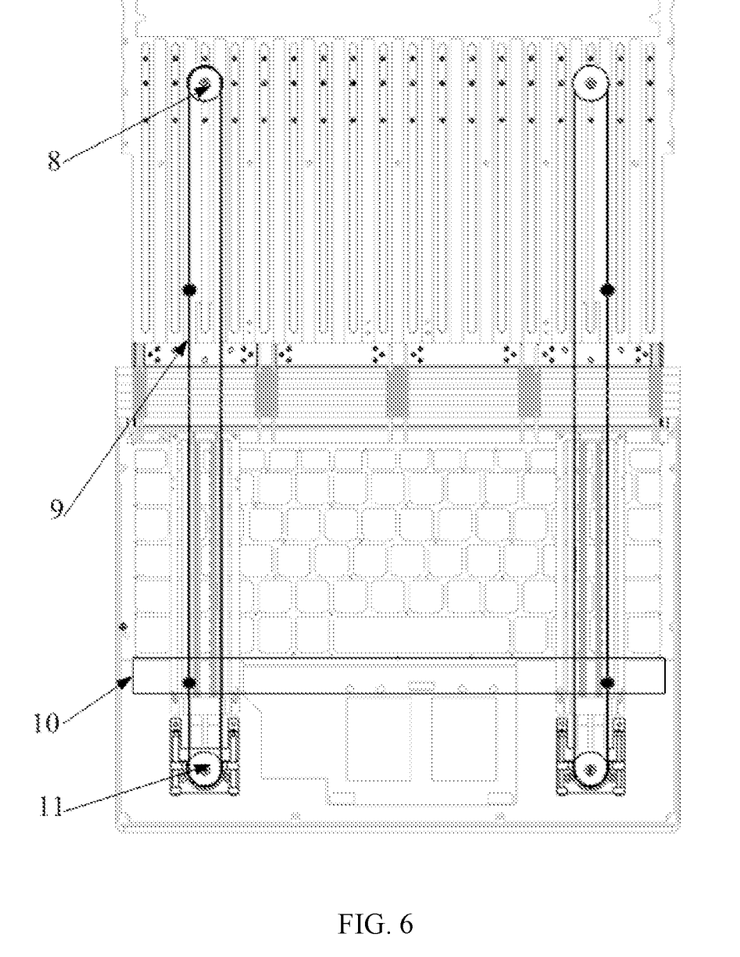
FIG. 6 illustrates a schematic internal structural diagram of an electronic apparatus according to embodiments of the present disclosure.

In some embodiments, as shown in FIG. 6, the drive structure includes a drive assembly 7 configured to provide a movement drive force along the connection line direction. A drive end of the drive assembly 7 can be fixedly connected to one of the first sliding holder 4 and the second sliding holder 10. The drive structure includes a transmission mechanism configured to drive and connect the first sliding holder 4 and the second sliding holder 10 to cause the first sliding holder 4 and the second sliding holder 10 to slide synchronously. The transmission mechanism includes a first transmission wheel 8, a second transmission wheel 11, a linear connector 9, and a damper 12. The first transmission wheel 8 can be rotatably arranged at the fixed holder. The second transmission wheel 11 can be rotatably arranged at the base 3. The linear connector 9 can be connected to the first transmission wheel 8 and the second transmission wheel 11 around the rotation shaft device 2. The linear connector 9 can be fixedly connected to one of the first sliding holder 4 and the second sliding holder 10. The drive assembly 7 can drive the linear connector 9 to move around the first transmission wheel 8 and the second transmission wheel 11 to drive the first sliding holder 4 and the second sliding holder 10 to slide synchronously along the connection line direction. The damper 12 can provide a tension force to tension the linear connector 9. Thus, the linear connector 9 can be tensioned between the first transmission wheel 8 and the second transmission wheel 11.

When the opening and closing angle of the first body relative to the second body is adjusted, a length of the connection line of the first transmission wheel 8, the rotation shaft device 2, and the second transmission wheel 11 can change. The damper 12 can be configured to ensure that the linear connector 9 is in a tensioned state at any opening and closing angle to ensure the transmission function.

In the disclosure, the drive end of the drive assembly 7 can be configured to directly drive one of the first sliding holder 4 and the second sliding holder 10 to slide along the connection line direction and simultaneously drive the linear connector 9 to move around the first transmission wheel 8 and the second transmission wheel 11. Thus, the other one of the first sliding holder 4 and the second sliding holder 10 can be indirectly driven to synchronously slide along the connection line direction. Thus, the first sliding holder 4 and the second sliding holder 10 can be driven to slide simultaneously by using a power source, which saves the power source and saves the power consumption.

In the present disclosure, the first sliding holder 4 and the second sliding holder 10 can also be driven by separate drive assemblies 7, respectively.

Figure 7:
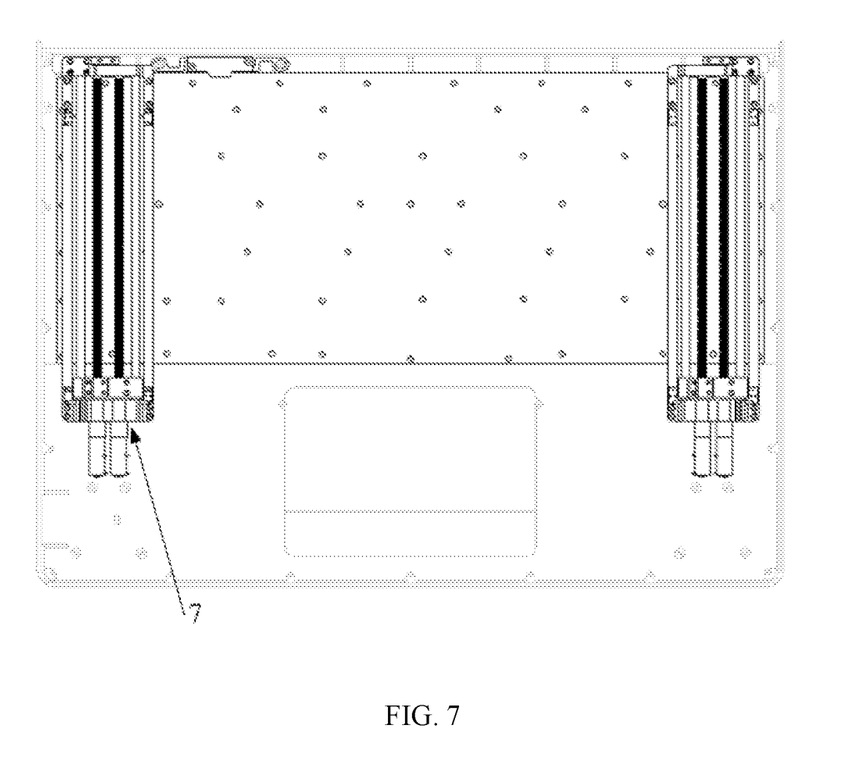
FIG. 7 illustrates a schematic diagram showing a mounting position of a drive assembly according to embodiments of the present disclosure.

As shown in FIG. 7, to improve space utilization, the drive assembly 7 is arranged at the base 3. The drive assembly 7 includes a ball screw mechanism. The ball screw mechanism includes a smooth shaft 76, a threaded screw 74, a nut, a motor 71, and a drive sliding block 73. The threaded screw 74 and the nut can threadedly cooperate with each other. The screw 74 and the smooth shaft 76 can be arranged along the connection line direction. The nut and the smooth shaft 76 can slidably cooperate along the connection line direction. The motor 71 can be configured to drive the threaded screw 74 to rotate to move the nut along the connection line direction. The drive sliding block 73 can be arranged at the nut. The drive sliding block 73 can be connected to the second sliding holder 10 and the linear connector 9. The linear connector 9 can be fixedly connected to the first sliding holder 4.

In some embodiments, the drive assembly 7 can be arranged at the base 3. The drive sliding block 73 of the drive assembly 7 can be directly connected to the second sliding holder 10. The drive sliding block 73 can also be connected to the first sliding holder 4 through the linear connector 9. When the flexible screen 1 is adjusted, the drive assembly 7 can directly drive the second sliding holder 10 to slide and indirectly drive the first sliding holder 4 to slide through the linear connector 9.

In some embodiments, the base 3 can include a processing unit configured to process data, an input unit configured to input data to the flexible screen 1, and an accommodation groove configured for the second end to be inserted. The overall space is large. Idle space can be used to mount the drive assembly, which can avoid increasing the thickness of the entire electronic apparatus due to the drive assembly 7. In some other embodiments, the drive assembly 7 can also be arranged at the first body.

Figure 5:
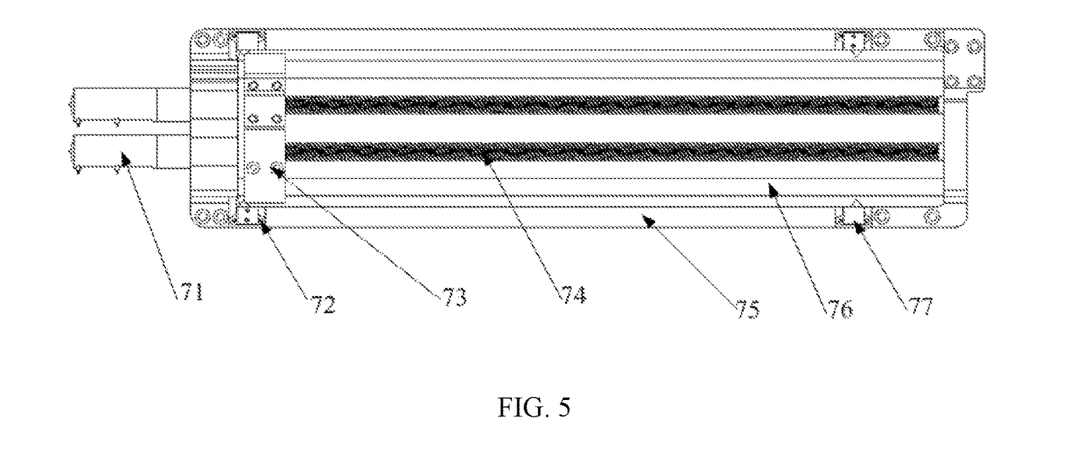
FIG. 5 illustrates a schematic structural diagram of a drive assembly according to embodiments of the present disclosure.

As shown in FIG. 5, to facilitate installation, the drive assembly 7 includes an installation frame 75 arranged along the connection line direction. The ball screw mechanism and the drive sliding block 73 are arranged in the installation frame 75. The motor 71 is arranged at an end of the installation frame 75 away from the rotation shaft device 2. To limit the sliding-out and sliding-in limit positions of the second end of the flexible screen 1, the installation frame 75 also includes a first limit switch 72 configured to limit the slide-in position and a second limit switch 77 configured to limit the slide-out position. Thus, the flexible screen 1 can be adjusted within a target display size range to ensure optimal use of the screen.

During assembly, the installation frame 75 can be fixed on the inner wall of an installation chamber of the base 3. When the drive assembly 7 is working, the motor 71 can drive the threaded screw 74 to rotate. Since the nut threadedly cooperates with the threaded screw 74 and slidably cooperates with the smooth shaft 76 along the connection line direction, the rotation of the threaded screw 74 can be converted into the linear movement of the nut along the smooth shaft 76. Thus, the drive sliding block 73 at the nut can be driven to move along the connection line direction. The drive sliding block 73 can be used as the drive end of the drive assembly 7 to simultaneously drive the first sliding holder 4 and the second sliding holder 10 to slide.

The drive assembly 7 can also use other structures, such as an electric push rod and a linear motor 71, to achieve the same technical effect of providing a drive force in the sliding direction of the flexible screen 1, which is not limited to the present disclosure.

To improve driving stability, two sets of drive assemblies 7 can be provided and arranged at two ends of the base 3 in the rotation axis direction of the rotation shaft device 2, respectively. Each set of drive assemblies 7 can include a first drive assembly and a second drive assembly that are operated synchronously. The first drive sliding block 73 of the first drive assembly can be connected to the linear connector 9 and configured to drive the linear connector 9 to move to drive the first sliding holder 4 to move along the sliding direction of the flexible screen 1. The second drive sliding block 73 of the second drive assembly can be connected to the second sliding holder 10 and configured to drive the second sliding holder to move along the sliding direction of the flexible screen 1. The drive sliding block 73 can include the first drive sliding block 73 and the second drive sliding block 73.

In some embodiments, the two sets of drive assemblies 7 can be configured to drive the first sliding holder 4 and the second sliding holder 10 to synchronously slide at two ends of the rotation shaft device 2 in the rotation axis direction, respectively. At each end, the first drive assembly and the second drive assembly that are operated synchronously can be configured to drive the linear connector 9 and the second sliding holder 10 to move to provide stronger sliding drive power to improve the sliding stability and smoothness.

In the present disclosure, each set of drive assemblies 7 can also include only one drive assembly 7. The drive sliding block 73 of the drive assembly 7 can be connected to the linear connector 9 and the second sliding holder 10. The driving assembly 7 can also be a set, which can transmit power to the middle part of the first sliding holder 4 and the second sliding holder 10, or a transmission mechanism can be configured to divide and transmit the power of the drive assembly 7 to two ends of the first sliding holder 4 and the second sliding holder 10 to achieve the same technical effect of driving the two ends of the flexible screen 1 to slide, which is not limited to the present disclosure.

Figure 10:
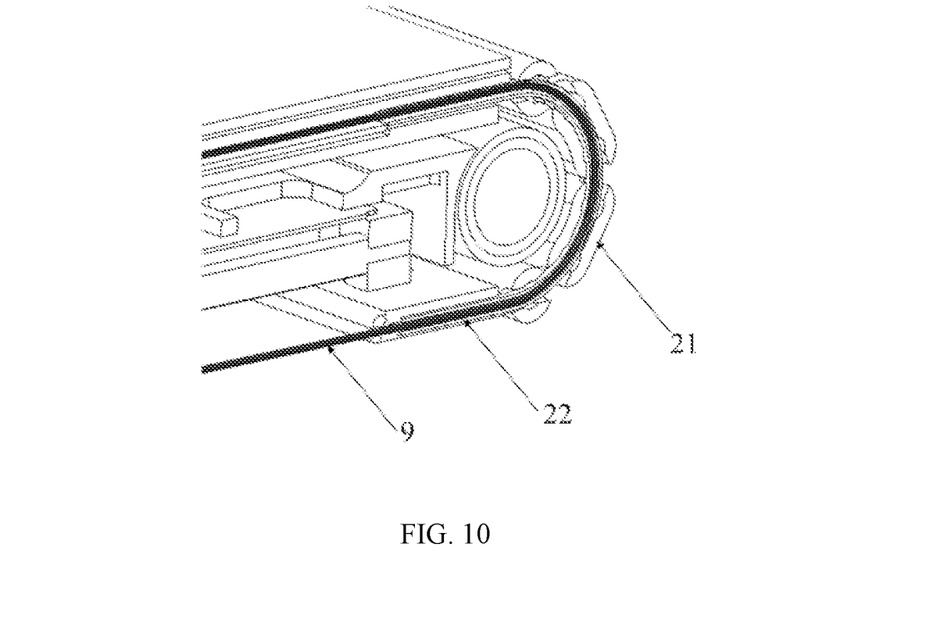
FIG. 10 illustrates a schematic structural diagram showing cooperation of a rotation axis device and a linear connector according to embodiments of the present disclosure.

To simplify the structure, as shown in FIG. 10, the linear connector 9 is a transmission rope. The rotation shaft device 2 includes a rotation shaft assembly 21 and an elastic rope layer 22 arranged inside the rotation shaft assembly 21. The elastic rope layer 22 includes a sliding rope groove configured for the rope to pass through.

In some embodiments, the elastic rope layer 22 can be made of POM material. The sliding rope groove can be formed in the middle. The elastic rope layer 22 can deform synchronously with the movement of the rotation shaft assembly 21. The transmission rope may not directly contact the rotation shaft assembly 21. The sliding friction of the transmission rope can be reduced through the sliding rope groove to ensure the transmission rope to move smoothly.

The first transmission wheel 8 and the second transmission wheel 11 can be both guide pulleys. When the guide pulleys rotate relative to the transmission rope, a damping force can be generated to ensure the reliability of the power transmission. Moreover, the space taken by the transmission rope can be reduced. The pulleys can be relatively light and have a low cost.

The linear connector 9 can also be a transmission chain. The first transmission wheel 8 and the second transmission wheel 11 can be chain wheels. The power can be transmitted through the cooperation of the transmission chains and the chain wheels.

Figure 8:
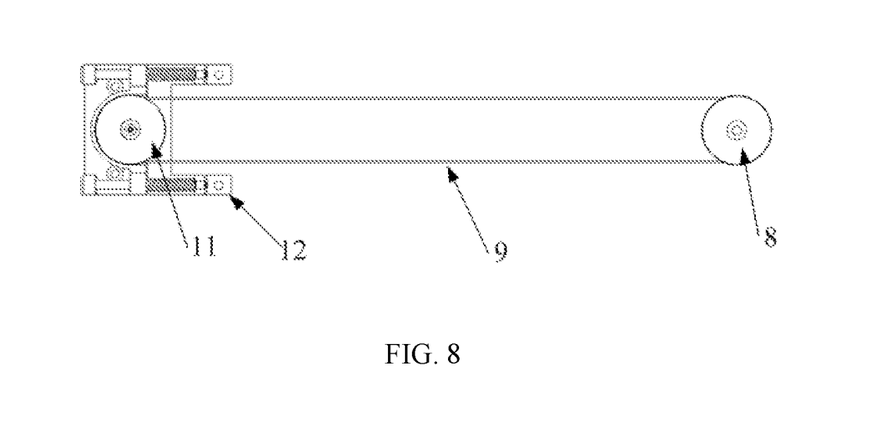
FIG. 8 illustrates a schematic structural diagram of a drive mechanism according to embodiments of the present disclosure.
Figure 9:
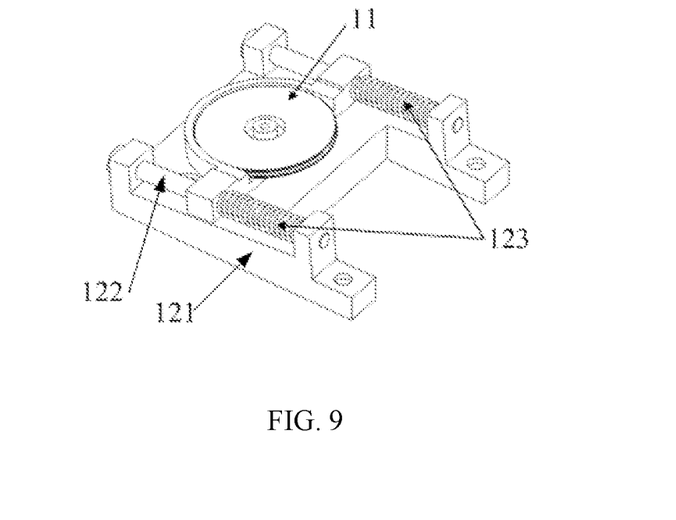
FIG. 9 illustrates a schematic structural diagram of a damper according to embodiments of the present disclosure.

As shown in FIGS. 8 and 9, the damper 12 includes a damping base 121 and a compression spring 123 arranged at the damping base 121. The damping base 121 includes a guide bar 122 arranged along a retraction direction of the compression spring 123. The damping base 121 includes a position limit block fixed at the end of the guide bar 122 close to the rotation shaft device 2 and a sliding block sleeved on the guide bar 122. The compression spring 123 is sleeved on the guide bar 122 and is located between the sliding block and the position limit block. The second transmission wheel 11 is arranged at the sliding block.

The compression spring 123 can slide along the guide bar 122 with the retraction of the linear connector 9. Thus, the retraction change of the linear connector 9 caused by the change of the opening and closing angles of the first body and the second body can be compensated.

In some embodiments, two compression springs 123 can be provided and arranged symmetrically on two sides of the second transmission wheel 11 to ensure that the tension forces of the linear connectors 9 on the two sides are consistent.

The damper 12 can also be a hydraulic damper, an electromagnetic damper, or another structure that can apply a linear damping force.

The electronic apparatus of the present disclosure can include a laptop computer or a mobile phone with a flexible screen 1. The size of the flexible screen 1 can be adjustable, which can meet various needs and bring innovative user experience to the user.

Embodiments of the present disclosure are described in a progressive manner. Each embodiment focuses on the difference from other embodiments. The same and similar parts of embodiments can be referred to each other.

The above description of embodiments of the present disclosure is provided to enable those skilled in the art to make or use the present disclosure. Various modifications to embodiments of the present disclosure are apparent to those skilled in the art. The general principles defined above can be implemented in other embodiments without departing from the spirit or scope of the present disclosure. Therefore, the present disclosure is not limited to embodiments described above, but conforms to the widest scope consistent with the principles and novel features of the present disclosure.

What is claimed is:

1. An electronic apparatus comprising:
   a first body;
   a second body rotatably connected to the first body through a rotation shaft device to cause an opening and closing angle of the first body relative to the second body to be adjustable; and
   a flexible screen configured to display images, a first end of the flexible screen being slidably arranged at the first body along a connection line direction of the first body and the second body, a second end being slidably arranged at the second body along the connection line direction, and the first end and the second end being two ends of the flexible screen in the connection line direction;
   wherein the first end and the second end of the flexible screen synchronously slide along the connection line direction to adjust a size of a part of the flexible screen located at the first body.

2. The electronic apparatus of claim 1, further comprising:
a drive structure configured to drive the first end and the second end of the flexible screen to synchronously slide along the connection line direction.

3. The electronic apparatus of claim 2, wherein:
the first body includes:
a fixed holder connected to the rotation shaft device and including a guide structure; and
a first sliding holder including a sliding structure cooperating with the guide structure along the connection line direction, the first end being fixed at the first sliding holder; and
the second body includes:
a base connected to the rotation shaft device and including an accommodation groove configured for the second end to be inserted; and
a second sliding holder slidably arranged at the base along the connection line direction and arranged at a bottom of the accommodation groove, the second end being arranged at the second sliding holder.

4. The electronic apparatus of claim 3, wherein:
the fixed holder includes:
a fixed support plate; and
a guide rod arranged at the fixed support plate, extending along the connection line direction;
the guide structure includes guide grooves arranged on two sides of the guide rod;
the first sliding holder is stacked on a first sliding support plate of the fixed support plate, the first sliding support plate includes a chute, the sliding structure is sliding protrusions arranged on two sidewalls of the chute, and the sliding protrusions have a one-to-one correspondence with the guide grooves; and
the second sliding holder is a second sliding support plate.

5. The electronic apparatus of claim 4, wherein a surface friction coefficient of the guide rod is smaller than a surface friction coefficient of the fixed support plate.

6. The electronic apparatus of claim 4, wherein:
a plurality of guide rods are provided and distributed evenly along a rotation axis direction of the rotation shaft device;
a plurality of chutes are provided and have a one-to-one correspondence with the plurality of guide rods, the chutes including position limiting surfaces of limiting the guide rods to depart from the chutes at two ends of the connection line direction;
the fixed support plate includes a plurality of avoidance grooves evenly distributed along the rotation axis direction, the avoidance grooves divides a side of the fixed support plate away from the rotation shaft device into a plurality of support stripes, and the guide rods are arranged at the support stripes in a one-to-one correspondence; and
the first sliding support plate includes a plurality of sliding support stripes located in the avoidance grooves in the one-to-one correspondence, and a surface of the sliding support stripes away from the flexible screen and a surface of the fixed support plate away from the flexible screen satisfy a co-planar condition.

7. The electronic apparatus of claim 4, further comprising:
a drive assembly configured to provide a movement drive force along the connection line direction, a drive end of the drive assembly being fixedly connected to one of the first sliding holder and the second sliding holder;
a transmission mechanism configured to be connected to the first sliding holder and the second sliding holder to drive the first sliding holder and the second sliding holder to slide synchronously, and including:
a first transmission wheel rotatably arranged at the fixed holder;
a second transmission wheel rotatably arranged at the base;
a linear connector connected to one of the first transmission wheel and the second transmission wheel around the rotation shaft device and fixedly connected to the other one of the first transmission wheel and the second transmission wheel, the drive assembly driving the linear connector to move around the first transmission wheel and the second transmission wheel to drive the first sliding holder and the second sliding holder to synchronously slide along the connection line direction; and
a damper providing a tension force for tensioning the linear connector to tension the linear connector at the first transmission wheel and the second transmission wheel.

8. The electronic apparatus of claim 7, wherein the drive assembly is arranged at the base and includes:
a ball screw mechanism including a smooth shaft, and a threaded screw and a nut that are threadedly cooperate with each other, the threaded screw and the smooth shaft being arranged along the connection line direction, and the nut slidably cooperating with the smooth shaft along the connection line direction;
a motor configured to drive the threaded screw to rotate to cause the nut to move along the connection line direction; and
a drive sliding block arranged at the nut and connected to the second sliding holder and the linear connector, the linear connector being fixedly connected to the first sliding holder.

9. The electronic apparatus of claim 8, wherein:
the drive sliding block includes a first drive sliding block and a second drive sliding block; and
two sets of drive assemblies are provided and arranged at two ends of the base in the rotation axis direction of the rotation shaft device, and each set of drive assemblies including:
a first drive assembly including the first drive sliding block connected to the linear connector and configured to drive the linear connector to drive the first sliding holder to move along a sliding direction of the flexible screen; and
a second drive assembly including the second drive sliding block connected to the second sliding holder and configured to drive the second sliding holder to move along the sliding direction of the flexible screen.

10. The electronic apparatus of claim 7, wherein:
the linear connector is a transmission rope;
the rotation shaft device includes a rotation shaft assembly and an elastic rope layer arranged inside the rotation shaft assembly, the elastic rope layer including a sliding guide groove for the transmission rope to pass through;
the first transmission wheel and the second transmission wheel are guide pulleys;
the damper includes:
a damping base including:
a guide bar arranged along a retraction direction of the compression spring;
a position limiting block fixed at an end of the guide bar close to the rotation shaft device; and a sliding block sleeved at the guide bar, the second transmission wheel being arranged at the sliding block; and a compression spring sleeved at the guide bar and located between the sliding block and the position limiting block.

\* \* \* \* \*